United States Patent
Svensson

[11] Patent Number: 6,138,616
[45] Date of Patent: Oct. 31, 2000

[54] DEVICE AND METHOD IN COMBUSTION ENGINES

[75] Inventor: Arne Svensson, Torslanda, Sweden

[73] Assignee: AB Volvo, Sweden

[21] Appl. No.: 09/180,177

[22] PCT Filed: Apr. 29, 1997

[86] PCT No.: PCT/SE97/00715

§ 371 Date: May 6, 1999

§ 102(e) Date: May 6, 1999

[87] PCT Pub. No.: WO97/41346

PCT Pub. Date: Nov. 6, 1997

[30] Foreign Application Priority Data

May 2, 1996 [SE] Sweden .................................. 9601680

[51] Int. Cl.[7] .................................................. F02B 41/00
[52] U.S. Cl. .......................................... 123/26; 123/188.2
[58] Field of Search .................... 123/188.2, 26, 123/188.15

[56] References Cited

U.S. PATENT DOCUMENTS

| | | |
|---|---|---|
| 3,792,691 | 2/1974 | Sahnas . |
| 3,987,769 | 10/1976 | Yew .......................................... 123/75 |
| 4,162,668 | 7/1979 | Jacob et al. . |
| 4,240,381 | 12/1980 | Lowther .................................... 123/26 |
| 5,064,423 | 11/1991 | Lorenz et al. . |

FOREIGN PATENT DOCUMENTS

| | | |
|---|---|---|
| 0 726 385 A1 | 8/1996 | European Pat. Off. . |
| 1401216 | 4/1965 | France . |
| 24-35628 | 3/1975 | Germany ................................. 123/26 |
| 61-207872 | 9/1986 | Japan ....................................... 123/26 |
| 63-9632 | 1/1988 | Japan ....................................... 123/26 |

Primary Examiner—Andrew M. Dolinar
Assistant Examiner—Katrina B. Harris
Attorney, Agent, or Firm—Lerner, David, Littenberg, Krumholz & Mentlik, LLP

[57] ABSTRACT

Apparatus is disclosed for supplying air to an internal combustion engine including an inlet for supplying air to at least one cylinder in the engine, a tank for storing additional air under pressure, a feeder for supplying additional air from the tank, a valve for supplying additional air to the cylinder from the feeder, the valve including a first valve portion for supplying the air to the cylinder, the first valve portion being moveable between a closed position in which the air cannot be supplied to the cylinder and an open position in which the air is supplied to the cylinder and including a passage connected to the feeder for supplying the additional air to the cylinder therethrough. Methods for supplying air to an internal combustion engine are also disclosed.

13 Claims, 5 Drawing Sheets

DEVICE AND METHOD IN COMBUSTION ENGINES

TECHNICAL FIELD

The invention relates to a device in a combustion engine, according to the preamble of claim 1. In particular the invention relates to a device for feeding additional air to the engine. The invention also relates to a method for the feeding of additional air, according to the preamble of claim 19.

BACKGROUND OF THE INVENTION

In connection with combustion engines, turbo units are often utilized which comprise a turbine which is rotated by the flow of exhaust gases. The energy which is thus absorbed by the turbine is then transferred to a compressor which is arranged to compress the air on the intake side of the combustion engine and thus increase the amount of air in the combustion chamber. This means that a larger amount of fuel can be fed to a combustion chamber in an engine, thus increasing the power of the engine.

In turbocharged diesel engines intended for, for example, commercial vehicles the starting torque from the engine is often somewhat inadequate. The reason for this is that a turbocharged engine functions as an aspirating engine at low rpm's. The fact that the engine has a starting phase which corresponds to the function of an aspirating engine means that the amount of air which is typical for a turbocharged diesel engine is not supplied. This in turn means that the amount of fuel which is injected in the engine must be limited at low rpm's, in order to minimize the amount of smoke produced until the turbo unit can supply an amount of air which will permit an increased amount of fuel.

The above-mentioned sequence of events is furthermore unfavourable since it contributes to reduced performance during the starting phase of the engine. The engine will furthermore be perceived by those travelling in the vehicle as "insufficient" during the starting phase, since it has been necessary to limit the amount of fuel supplied during the initial "aspirating engine" phase.

one way of solving the above-mentioned problem is to feed extra additional air to the engine during this starting phase in order to thus simulate the turbo function and create the possibility of feeding extra fuel to the engine. Such an arrangement is previously known from patent document CH 623382 and comprises an arrangement in an engine where compressed air is pumped into the cylinders of the engine when starting.

SUMMARY OF THE INVENTION

The object of the present invention is to obtain an improved device in a combustion engine which is preferably equipped with a turbo unit, where the turbo function can be initiated earlier than in previously known devices and which adds to the starting torque of the engine. This object is achieved by means of a device of the initially mentioned kind, the characteristics of which will become evident from claim 1. The object is also achieved by means of a method, the characteristics of which will become evident from claim 19.

Preferred embodiments will become evident from the dependent claims.

The term "additional air" in the following refers to air supplied by means of the invention to each of the engine cylinders under certain predetermined conditions. The term "ordinary air" refers to air fed to the engine during its normal operation.

BRIEF DESCRIPTION OF THE DRAWINGS:

The invention will be described in the following in greater detail with reference to the appended drawings, in which:

FIG. 1 schematically shows a combustion engine in which the present invention is utilized, FIG. 2 shows a cross-section of a valve device which can be utilized according to the present invention, FIG. 3a–3e schematically show the function of the valve device of FIG. 2, FIG. 4 shows a cross-section of a camshaft which can be used in the invention, FIG. 5 shows a cross-section of a control valve which can be used according to the present invention, and FIG. 6 shows an alternative embodiment of the invention.

PREFERRED EMBODIMENTS

Figure 1:
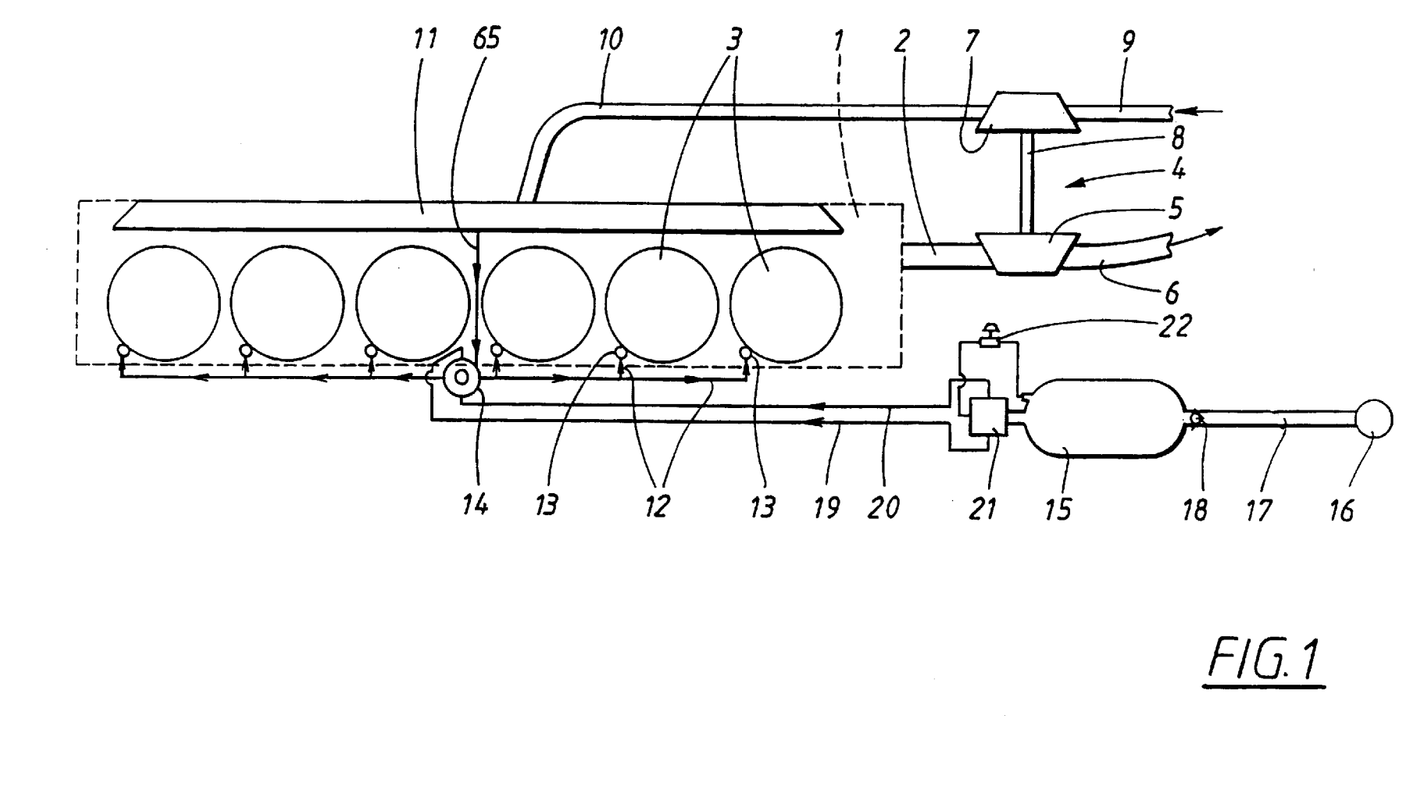
FIG. 1 is a top, elevational, schematic representation of an internal combustion engine in which the present invention is utilized.

FIG. 1 schematically shows a device in which the present invention can be used. The thus shows a combustion engine 1 which is preferably a conventional diesel engine. The engine 1 in a known manner has an outlet 2 through which the exhaust gases generated in the combustion chamber of the engine 1 are led. The engine 1 further comprises a plurality of cylinders 3. Although FIG. 1 illustrates an engine 1 equipped with six cylinders, the invention can also be used in connection with other cylinder configurations.

The outlet 2 leads to a turbo unit 4, which in a known manner comprises a turbine 5. The flow of exhaust gases through the outlet 2 causes the turbine 5 to rotate, thus absorbing energy from the exhaust gases. When the exhaust gases have passed through the turbine 5, they are transported away through an exhaust pipe 6. In a manner which as such is known, the turbine 5 drives a compressor 7 which is connected to the turbine 5 via a spindle 8 which is common to the turbine 5 and the compressor 7. The compressor 7 compresses the air which is taken in via an inlet 9. The air supplied via the compressor 7 is fed to the engine 1 via an air passage 10 which terminates in an intake casing 11. The air which is supplied via the intake casing 11 is then fed to the different cylinders 3. Furthermore, fuel is fed to the different cylinders 3 via (not shown) injection devices.

The invention is based on the principle of feeding additional air directly into the cylinders 3 in connection with the starting phase of the engine 1, i.e. during the initial phase when it functions as an aspirating engine. This air is fed via a plurality of air passages 12, which lead up to the different cylinders 3. The feeding of air to the different cylinders 3 is done by means of special valve devices 13 which are provided at each of the different cylinders 3. The function and design of such a valve device 13 will be described in detail below, with reference to FIG. 2.

The air to the different air passages 12 is controlled by means of a control valve 14, which is arranged in connection with the engine 1. The function and design of the control valve 14 will be described below in connection with FIG. 5. Air is fed to the control valve 14 from a pressure tank 15, which is arranged in the vehicle in question. The pressure tank 15 is in turn fed with air from the brake air compressor 16 via an air passage 17 and a clack valve 18, which is arranged in communication with the pressure tank 15. Apart from a brake air compressor 16, another source of compressed air can also be used for this purpose. Air can be fed from the pressure tank 15 to two feeder passages 19, 20 and further on to the control valve 14. By means of a relay valve 21 and a control means 22, which are arranged in connection with the pressure tank, the working pressure in the feeder passages 19, 20 can be adjusted. In this connection it is advantageous to use a relay valve 21, since such a valve can efficiently handle large mass-flows of air from the pressure tank 15 to the control valve 14. Although FIG. 1 shows a relay valve 21 which is connected to feeder passages 19, 20, a relay valve with only one feeder passage can also be used according to the invention. The working pressure in the feeder passages 19, 20 is set so that it is somewhat lower than the pressure in the pressure tank 15. The difference in pressure is a measure of the capacity of the system.

According to what will be described in greater detail in the following, the control valve 14 can be activated when there is a need for additional air, for example when starting the engine, in which case air is fed from the pressure tank 15 via the feeder passages 19, 20 and the control valve 14 to respective valves 13 on the cylinders 3.

Figure 2:
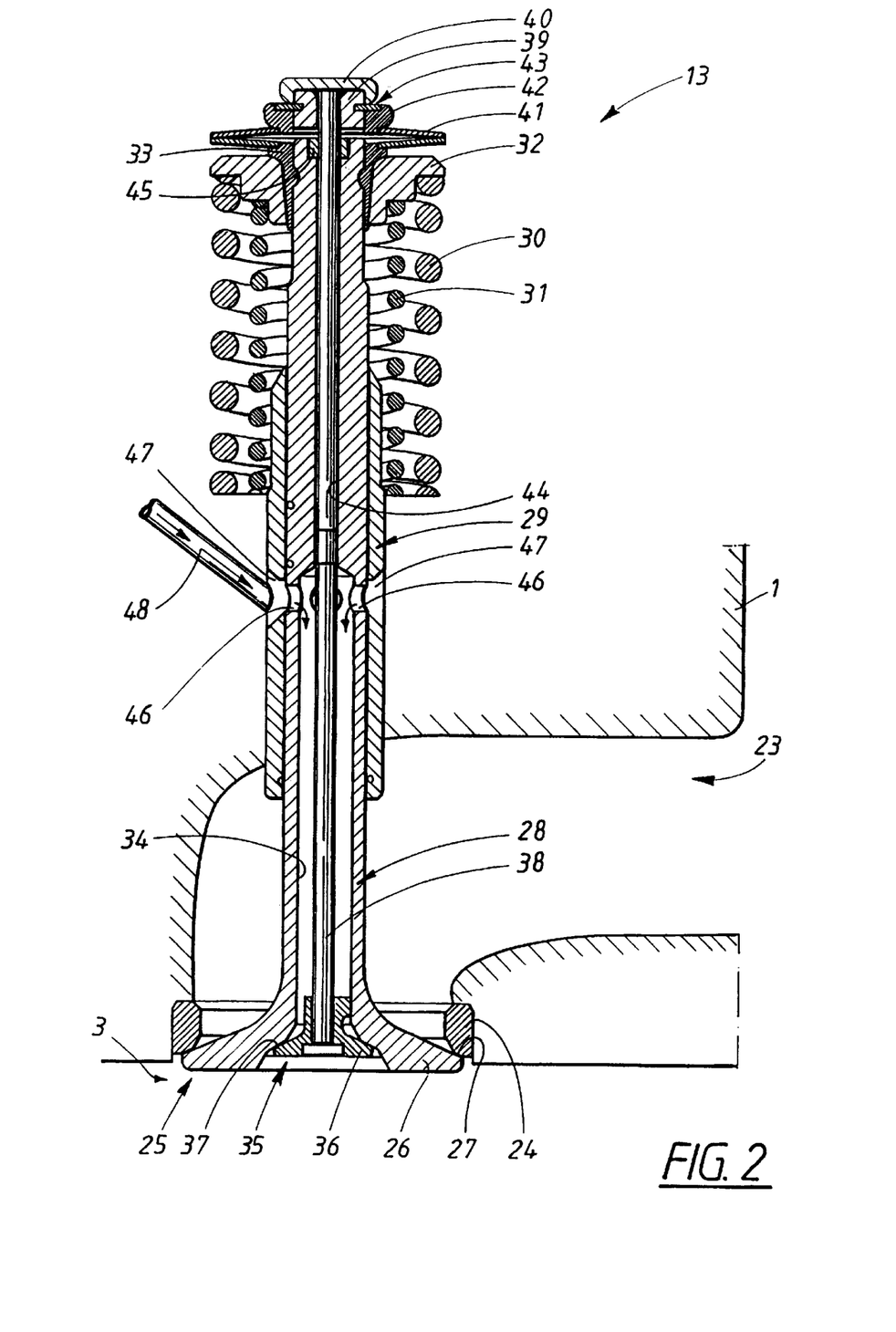
FIG. 2 is a side, elevational, cross-sectional view of a valve device which can be utilized according to the present invention.

When air is fed to a certain cylinder 3, this is done by means of the above-mentioned valve device 13 which will now be described with reference to FIG. 2. The valve device 13 is arranged at the inlet 23 of the different cylinders 3 of the engine 1. The inlet 23 is used for feeding ordinary air to the cylinder 3. At the point where the inlet 23 enters the cylinder 23, there is arranged a valve seat 24 against which a first valve 25 is arranged. To this end, the first valve 25 comprises a first valve head 26, which is in contact with a lower, essentially circular edge 27. The first valve head 26 is connected to a first valve-stem 28, which runs in an essentially jacket shaped valve guide 29. The function of the first valve 25 corresponds to the ordinary valve function of a diesel engine for the supply of ordinary air to the combustion in the different cylinders.

Using the force from an external valve spring 30 and an internal valve spring 31, the first valve head 26 is influenced to be in contact with the valve head 24. To be more exact the valve springs 30, 31 are in contact with, and press against, a spring washer 32 which via a valve lock 33 is in connection with the first valve-stem 28.

The lower part of the first valve-stem 28 is essentially tube-shaped, and comprises an inner passage-section 34 which at its lower end is widened in such a way that it houses a second valve 35 with a second valve head 36 which is in contact with a further valve head in the shape of an inner surface 37 of the first valve head 26. The second valve head 36 is furthermore connected to a second valve-stem 38 which has its extension inside the passage-section 34. The upper end of the second valve-stem 38 is connected to a valve tip 39, on the upper side of which there is arranged a valve cap 40. The second valve head 36 is moved to the position where it is in contact with the inside of the first valve head 26 by means of a spring element 41 which comprises two cup-springs. This spring element 41 is attached to the valve tip 39 via a spring washer 42 which is locked against the valve tip 39 using a locking clip 43.

The upper part of the first valve-stem 28 is shaped with a through-going passage-section 44, the inner dimensions of which essentially correspond to the outer dimensions of the second valve-stem 38. The second valve-stem 38 furthermore runs inside the upper passage-section 44 by means of a liner 45. The upper passage-section 44 joins the lower passage-section 34 which thus has a larger diameter than the upper passage-section 44. There is furthermore arranged along the circumference of the first valve-stem 28 a plurality of holes 46, preferably four. The valve guide 29 furthermore consists of an upper part and a lower part arranged in the cylinder head. The gap between the lower end of the upper part and the upper end of the lower part is shaped as a cavity 47 to which a feeder passage 48 is connected. In the normal position of the valve device 13, i.e. when the first valve 25 is in contact with the valve head 24 and the second valve 35 is in contact with the inside of the first valve head 26, the cavity 47 in the valve guide 29 is aligned with the holes 46 in the first valve-stem 28.

In order to connect additional air to the cylinder 3 there is furthermore provided a drilled feeder passage 48 which terminates at the cavity 47 in the valve guide 29. The feeder passage 48 is connected to the different air passages 12 (compare FIG. 1). As will be described in detail below, air can be supplied to the feeder passage 48 via the control valve 14 and further on to the lower passage-section 34. The additional air is thus led towards the engine cylinder via the second valve 35 which can be opened and closed under certain conditions, as will be described below.

The second valve-stem 38 is at least along a certain section dimensioned so as to be a good fit against the lower end of the upper passage-section 44. This enables transfer of heat between the second valve-stem 38 and the first valve-stem 28, at the same time as it provides a sealing function which prevents air flowing upwards along the upper passage-section 44. It also protects the second valve-stem 38 from the risk of breaking, especially during rapid operation.

The function of the valve device 13 will now be described with reference to FIG. 2 and FIGS. 3a–3e which schematically illustrate the different stages when supplying air to the different cylinders 3. FIGS. 3a–3e show the intake stroke in a cylinder 3 which is equipped with the valve device 13 according to the invention. As is first shown in FIG. 3a, the piston 49 of the cylinder 3 is in its upper position in the cylinder 3. The piston 49 is, in a conventional manner, connected to the crankshaft 50 via a connecting rod 51. In this upper position the first valve 35 is in contact with the valve head 24 due to the spring-force from the springs 30, 31 (compare FIG. 2). Furthermore, the second valve 35 is in contact with the inside of the first valve head 26 due to the spring-force from the spring element 41.

In the next phase, as shown in FIG. 3b, the piston 49 moves downwards. At the same time the valve device 13 is influenced by the camshaft of the engine (not shown). Thus, the spring-force of the spring element 41 will first be exceeded, which leads to the second valve-stem 38 being pressed a small distance downwards, whereby the second valve head 36 is lifted out of contact with the inside of the first valve head 26. If the conditions for feeding additional air via the feeder passage 48 are fulfilled, and air has been fed to the lower passage-section 34, a marginal amount of additional air will now during a short time be fed to the cylinder 3.

FIG. 3c shows the following phase in which the piston 49 is on its way down and the first valve 25 has been lifted out of the valve seat 24. At this phase, the ordinary air is let into the cylinder 3 via the intake 23 in the cylinder head. Furthermore, the first valve-stem 28 has been displaced a distance downwards towards the cylinder 3. This means that the holes 46 are no longer aligned with the cavity 47, which causes the feeder passage 48 to be out of communication with the passage-section 34. This in turn means that no additional air is supplied during this phase.

In the next phase, which is shown in FIG. 3d, the piston 49 has just passed its lowest position and is on its way upwards. Furthermore, the camshaft of the engine has influenced the valve device 13 to be moved towards its initial position, so that the first valve 25 is now closed, i.e. the first valve head 26 is in contact with the valve seat 24. According to the invention, the control using the camshaft is so arranged that the second valve head 36 has not yet come into contact with the first valve head 26, i.e. the second valve 35 is still open. Furthermore, the first valve-stem 28 in this phase is in such a position that the holes 46 are essentially aligned with the cavity 47, which causes additional air to now be fed to the cylinder 3 via the passage defined by the lower passage section 34. In this way, the first valve 25 will thus be closed and the second valve 35 will be open for the supply of additional air, which takes place during the later part of the working phase when air is normally supplied to the cylinder 3. The duration of this sequence of events (i.e. the supply of additional air) is controlled by the shape of the camshaft, as will be described in detail below. The duration also depends on the positioning of the holes 46 in relation to the cavity 47.

Finally, FIG. 3e shows that the second valve-stem 38, and thus also the second valve head 36 has been released upwards, so that the second valve 35 is closed, i.e. the second valve head 36 is in sealing contact with the inside of the first valve head 26. The spring element 41 is here so dimensioned that its spring-force, which attempts to close the second valve 35, exceeds the force with which the air pressure in the lower passage-section 34 affects the second valve 35. Subsequent to this final phase, the compression stroke is in a known manner started and a larger amount of fuel can be supplied, since a certain amount of additional air now has been fed into the cylinder 3.

Figure 3A:
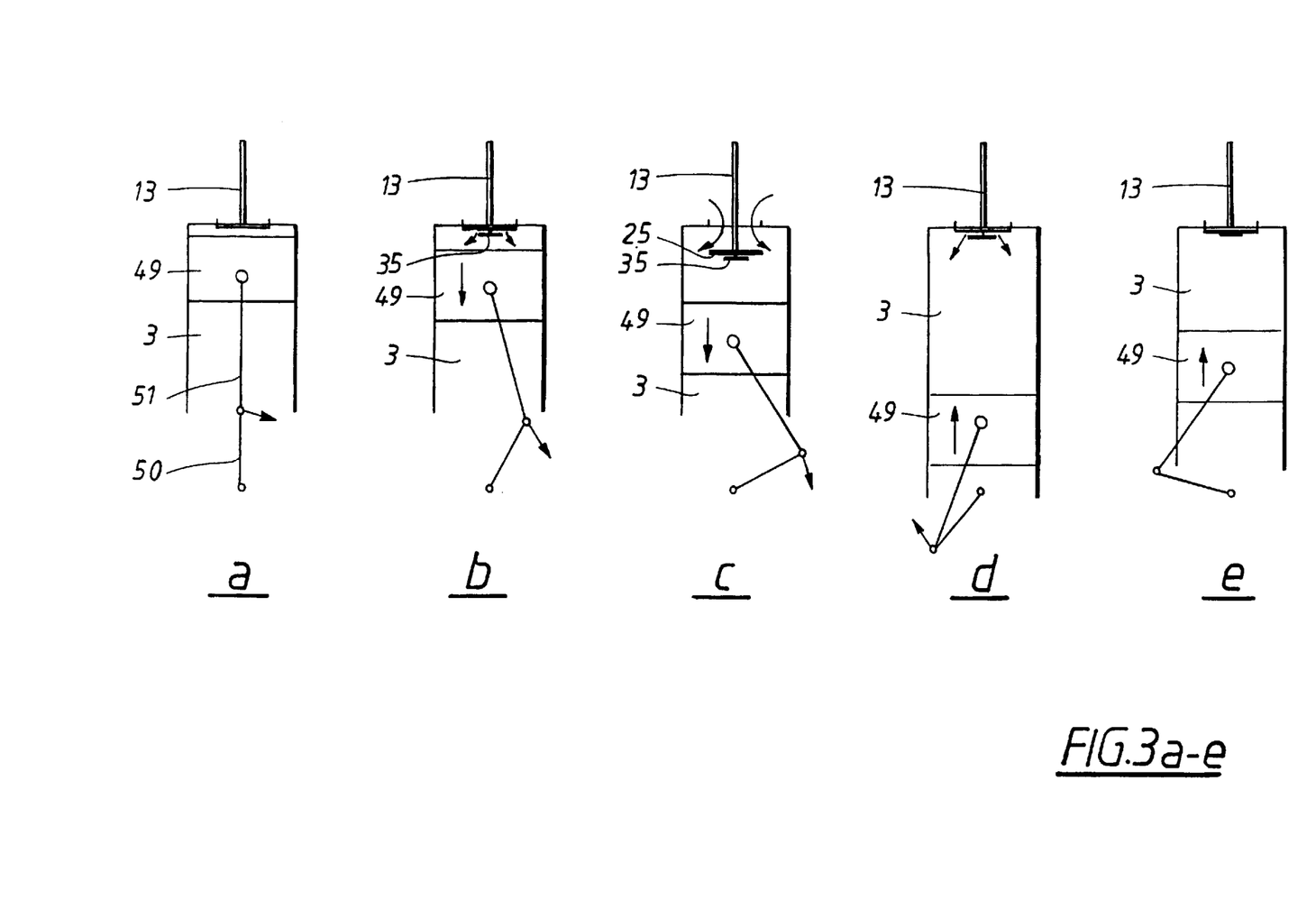
FIGS. 3a is a side, elevational, schematic representation of the function of the valve device shown in FIG. 2.
Figure 4:
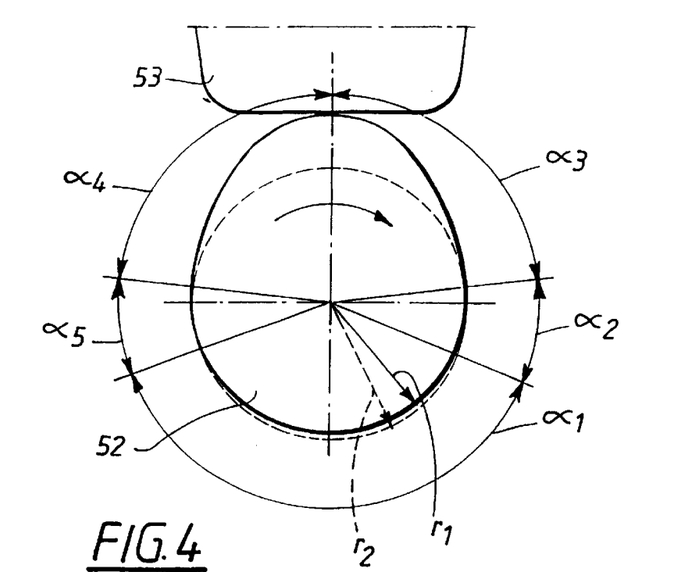
FIG. 4 is a side, elevational, cross-sectional view of a camshaft which can be used in the present invention.

FIG. 4 shows a schematic cross-section of a camshaft 52 which can be used in connection with the invention. In a way which as such is known, and which is not shown in detail in the s, the engine is used to drive the camshaft 52. The camshaft 52 affects a valve lifter 53, which in turn via a (not shown) arrangement with a push-rod and a rocker lever causes the valve device 13 to open and close. FIG. 4 shows the radius $r_1$ of the camshaft 52 with a solid line, while the radius $r_2$ of a basic circle is indicated with a broken line. The also shows five different angle-sectors $\alpha_1$, $\alpha_2$, $\alpha_3$, $\alpha_4$ and $\alpha_5$ which correspond to the different phases as shown in FIGS. 3a–3e. Angle-sector $\alpha_1$ thus corresponds to what is shown in FIG. 3a, i.e. the valve device 13 is closed, i.e. both the first valve 25 and the second valve 35 are closed. Angle-sector $\alpha_2$ corresponds to what is shown in FIG. 3b, i.e. the first valve 35 is open while the first valve 25 is closed. A marginal addition of air to the different cylinders takes place during a short amount of time here. Furthermore, angle-sector $\alpha_3$ corresponds to that shown in FIG. 3c, i.e. the first valve 25 is open but no additional air is supplied since the holes 46 are not aligned with the cavity 47. During angle-sector $\alpha_4$, the first valve 25 starts to close. Finally, angle-sector $\alpha_5$ corresponds to FIG. 3d, i.e. a position where the first valve 25 is closed but the second valve 35 is still kept open. This angle-sector $\alpha_5$ in this manner forms a "plateau" with an essentially constant radius of the camshaft 52 with additional air being supplied to the different cylinders. By varying the size of this angle-sector $\alpha_5$, the period of time during which additional air is supplied can be varied.

Figure 5:
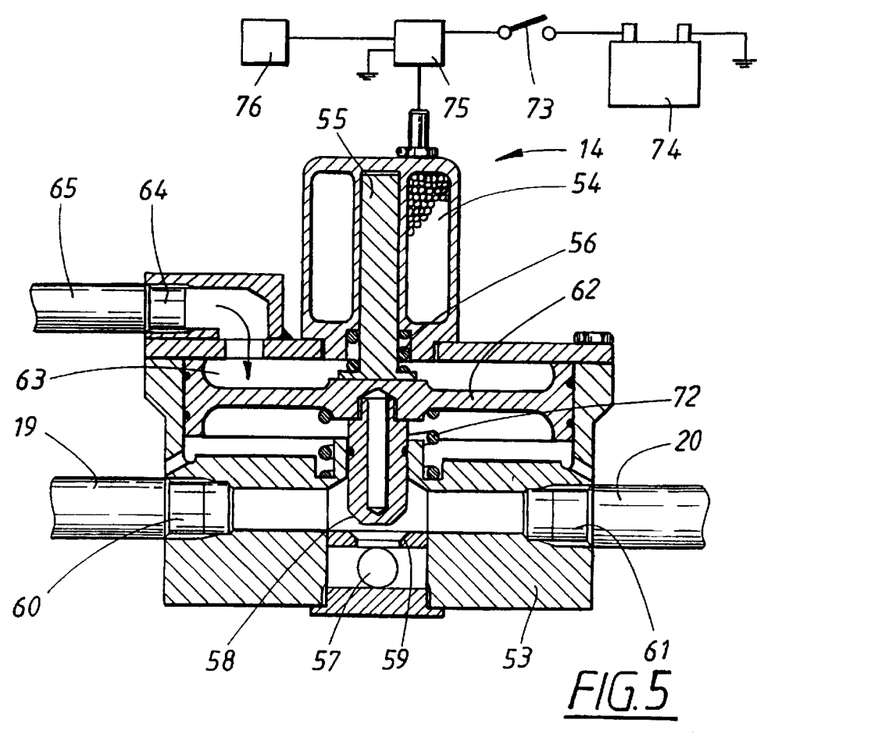
FIG. 5 is a side, elevational, cross-sectional view of a control valve which can be used according to the present invention.

FIG. 5 shows the control valve 14 which is used for feeding additional air from the pressure tank 15 to the different cylinders 3 (compare FIG. 1). The control valve 14 comprises a valve housing 53 in which there is arranged an electrical solenoid 54. The solenoid 54 is of an essentially known kind, and comprises a core 55 which in its normal condition is influenced by a closing-spring 56 to be moved in the direction of an outlet 57, which in turn is connected to the different air passages 12 (compare FIG. 1). The control valve 14 furthermore comprises a piston 62 arranged to be moved inside a cylinder in the valve housing 53. The piston 62 has a pin 58, the lower end of which is arranged to interact with a seat 59 arranged at the outlet 57, which seat preferably comprises a rubber surface. In this way, the outlet 57 can be blocked, which is done during certain conditions as will become evident in the following. The piston 62 with its corresponding pin 58 are also influenced towards an upper position in the cylinder 63 by means of an opening spring 72.

The cylinder 63 can furthermore be supplied with air at charging pressure from the inlet casing of the engine via a further inlet 64 which leads up to the cylinder 63. With reference to FIG. 1 and FIG. 5, it will become evident that the inlet jacket 11 is connected to the inlet 64 via a passage 65.

The function of the control valve 14 is controlled using a detector 73, preferably in the form of a switch for detecting the position of the accelerator-pedal in the vehicle. The detector 73 is connected to a power source 74 in the vehicle and to a relay 75. The relay 75 is also fed with a voltage from the generator 76 of the engine. In this way, the solenoid can only be activated when the engine is running. When this is the case, the solenoid can be activated if the accelerator-pedal is in a certain position, preferably fully depressed. This causes the core 55 to be pushed a certain distance into the solenoid 54 while compressing the spring 56. Normally this happens at the same time as the opening spring 72 has affected the piston 62 to assume its upper position in the cylinder 63, in which case the pin 58 is not in engagement with the seat 59. In this manner, additional air can be fed via the outlet 57 to the different air passages 12. For this purpose, the feeder passages 19 and 20 are connected to the control valve 14, and to be more exact, to two inlets 60 and 61.

If the control valve 14 is in its open position, additional air will thus be fed to the different cylinders. This enables additional fuel to be fed to the different cylinders. This in turn leads to an increase of the charging pressure at the inlet casing 11, and thus also at the inlet 64. If the charging pressure increases, it will affect the piston 62 and the pin 58 to be moved downwards against the force from the opening spring 72, so that the outlet 57 is blocked and the air supply is closed. When the piston 62 is pressed downwards, the core 55 will remain in its upper position. The control valve 14 is thus controlled by the position of the accelerator-pedal and the charging pressure from the engine. In this way, additional air can be supplied to the engine 1 only when it is really necessary, i.e. when the charging pressure falls below a lowest level.

Figure 6:
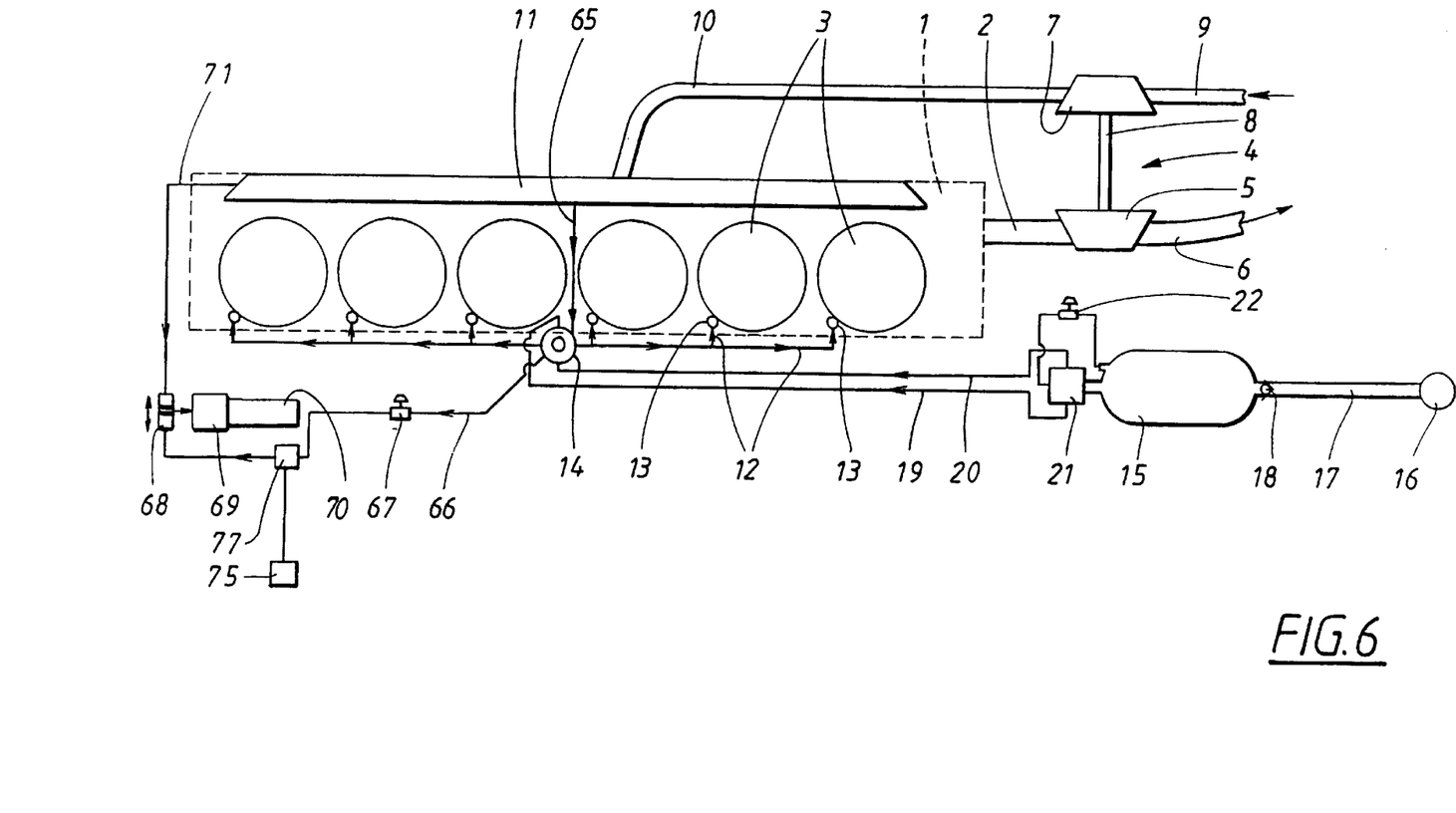
FIG. 6 is a top, elevational, schematic representation of an alternative embodiment of the invention.

FIG. 6 shows an alternative embodiment of the invention, in which the components which correspond to that which has been described above have been given corresponding reference numerals. In this embodiment the control valve 14 is also connected via a further connection 66 to a reducing valve 67 for the adjustment of a certain pressure which is brought to influence a two-way valve 68. This two-way valve 68 is arranged for pressurizing a smoke-limiter 69 of the engine for adding extra fuel to the combustion. The smoke-limiter 69 is known as such and is connected to an injection pump 70 of the engine, so that the amount of fuel supplied to the engine can be adjusted according to the charging pressure or the additional air. There is also a further connection 71 between the inlet jacket 11 and the two-way valve 68.

The smoke-limiter 69 is utilized to limit the amount of fuel injected to the engine 1 at low loads so that there is no smoke generated in the exhaust gases. When the load increases, the charging pressure in the inlet jacket 11 will increase. Via the connection 71 the smoke limiter is influenced by the charging pressure so that the injection pumps 70 delivers more fuel to the engine 1. Furthermore, the two-way valve 68 comprises a (not shown) moving piston, an inlet for the connection 71, an inlet for the connection 66 and an outlet for letting out air with the highest of the pressures present in the connections 71 and 66.

According to the invention additional air can be fed to the cylinders 3, thus enabling the feeding of an increased amount of fuel. Initially this will not cause an increase of pressure in the inlet jacket, i.e. the smoke-limiter 69 is not exposed to any charging pressure. Normally this would mean that an increased amount of fuel would not have been permitted. According to the embodiment, the smoke-limiter 69 is thus exposed to an "artificial pressures" which is supplied by the connection 66 being connected to the two-way valve 68. When the additional air is supplied with a certain pressure, air with this pressure is also fed to the two-way valve 68 which means that the injection pump 70 can be activated for an increased supply of fuel. When the ordinary charging pressure exceeds the pressure with which the smoke-limiter 69 is fed from the control valve 14 via the two-way valve 68, the charging pressure in the connection 71 takes over the control of the smoke-limiter 69 via the two-way valve 68. The "artificial pressure" delivered via the connection 66 is adjusted by means of the reduction valve 67.

The pressure from the control valve 14 can furthermore be dumped using a solenoid valve 77 connected after the reduction valve 67. The solenoid valve 77 is in turn connected to the relay 75 (see FIG. 5).

The invention is based on the principle that air is supplied from the pressure tank 15 during the initial "aspirating engine phase" of the engine, thus enabling an increased fuel amount to be supplied. This in turn generates a high increase in starting torque, which eliminates the perception of the engine as being insufficient with regard to the starting torque.

The invention is not limited to, the above-described embodiments but can be varied within the scope of the appended claims. The invention can for example be used in different kinds of combustion engines, e.g. diesel engines and gasoline engines. The invention is furthermore not limited to use in connection with turbocharged engines, but can also be used for supplying additional air in engines without turbo units.

Furthermore, the condition at which the solenoid 54 of the control valve 14 is activated can be a full throttle position of the accelerator-pedal or any other preset throttle position.

The control valve 14 can furthermore in an alternative embodiment be replaced by an electrically controlled valve which is controlled by a computer-based control unit. A detector for detecting the position of the accelerator-pedal can then be connected to the control unit which in turn controls the electrical valve for feeding additional air.

Finally, instead of the detector 73 another detector can be used to detect a certain operational parameter in a vehicle. For example detectors for detecting the rpm, amount of fuel and charging pressure can be utilized to control the function of the control valve.

What is claimed is:

1. Apparatus for supplying air to an internal combustion engine including at least one cylinder comprising an inlet for supplying air to said at least one cylinder, a tank for storing additional air under pressure, a feeder for supplying said additional air from said tank, a valve for supplying said additional air to said at least one cylinder from said feeder, said valve comprising a first valve portion for supplying said air to said at least one cylinder, said first valve portion being movable between a closed position in which said air cannot be supplied to said at least one cylinder and an open position in which said air is supplied to said at least one cylinder, said first valve portion including a passage connected to said feeder for supplying said additional air to said at least one cylinder therethrough.

2. The apparatus of claim 1 wherein said valve includes a second valve portion disposed in said passage, said second valve portion movable between a closed position in which said additional air cannot be supplied to said at least one cylinder and an open position in which said additional air is supplied to said at least one cylinder.

3. The apparatus of claim 2 including a spring element connected to said first and second valve portions, said spring element urging said second valve portion into said closed position.

4. The apparatus of claim 2 wherein said first valve portion includes a first valve stem, and said second valve portion includes a second valve stem, said second valve stem movably positioned within said passage, and said first and second valve stems being disposed substantially parallel to each other.

5. The apparatus of claim 2 including a valve seat for said at least one cylinder, and wherein said first valve portion includes a first valve head including an inner surface and contacting said valve seat when said first valve portion is in said closed position, and wherein said second valve portion includes a second valve head contacting said inner surface of said first valve head when said second valve portion is in said closed position.

6. The apparatus of claim 1 wherein said first valve portion includes closure means for terminating the flow of said additional air.

7. The apparatus of claim 6 wherein said closure means comprises at least one aperture connecting said feeder to said passage, said first valve portion being movable between a first position wherein said aperture is aligned with said feeder to supply said additional air through said aperture and a second position wherein said aperture is not aligned with said feeder and said additional air is not supplied through said aperture.

8. A method for supplying air to an internal combustion engine including at least one cylinder, an inlet for supplying air to said at least one cylinder, and a valve including a first valve portion including a passage therein, said method comprising supplying said air to said at least one cylinder from said inlet, and supplying additional air to said at least one cylinder through said passage in said first valve portion.

9. The method of claim 8 wherein said at least one cylinder includes an intake stroke, and including supplying said additional air to said at least one cylinder during a first predetermined time interval during said intake stroke with said first valve portion in a closed position.

10. The method of claim 8 including terminating said supply of said additional air during a second predetermined time interval during said intake stroke with said first valve portion in an open position.

11. The method of claim 8 including delivering said additional air to said at least one cylinder by means of a control valve, and actuating said control valve based on the pressure of a predetermined operational condition of said internal combustion engine.

12. The method of claim 11 including placing said control valve in a non-actuated condition based upon the presence of a predetermined charging pressure in said inlet.

13. The method of claim 11 including activating a smoke-limiter of said internal combustion engine by means of said additional air.

* * * * *

UNITED STATES PATENT AND TRADEMARK OFFICE
CERTIFICATE OF CORRECTION

PATENT NO. : 6,138,616
DATED : October 31, 2000
INVENTOR(S) : Svensson

It is certified that error appears in the above-identified patent and that said Letters Patent is hereby corrected as shown below:

Delete columns 1 thru 10 and substitute with the attached columns 1 thru 10.

Signed and Sealed this

Twenty-eighth Day of October, 2003

JAMES E. ROGAN
*Director of the United States Patent and Trademark Office*

DEVICE AND METHOD IN COMBUSTION ENGINES

FIELD OF THE INVENTION

The present invention relates to apparatus in an internal combustion engine. More particularly, the subject invention relates to apparatus for feeding additional air to such an engine. The present invention also relates to a method for the feeding of additional air to an internal combustion engine.

BACKGROUND OF THE INVENTION

In connection with internal combustion engines, turbo units are often utilized which comprise a turbine which is rotated by the flow of exhaust gases. The energy which is thus absorbed by the turbine is then transferred to a compressor which is arranged to compress the air on the intake side of the engine, to thus increase the amount of air in the combustion chamber. In this manner, a larger amount of fuel can be fed to a combustion chamber in an engine, thus increasing the power of the engine.

In turbocharged diesel engines intended, for example, for use in commercial vehicles, the starting torque from the engine is often somewhat inadequate. The reason for this is that a turbocharged engine functions as an aspirating engine at low rpm's. The fact that the engine has a starting phase which corresponds to the function of an aspirating engine means that the amount of air which is typical for a turbocharged diesel engine is not supplied. This, in turn, means that the amount of fuel which is injected into the engine must be limited at low rpm's, in order to minimize the amount of smoke produced until the turbo unit can supply an amount of air which will permit an increased amount of fuel.

The above-mentioned sequence of events is also unfavorable because it contributes to reduced performance during the starting phase of the engine. The engine will also be perceived by those travelling in the vehicle as "insufficient" during the starting phase, since it has been necessary to limit the amount of fuel supplied during the initial "aspirating engine" phase.

One way of solving the above-mentioned problem is to feed extra additional air to the engine during this starting phase in order to simulate the turbo function and create the possibility of feeding extra fuel to the engine. such an arrangement is previously known from Swiss Patent No. 23,382, and comprises apparatus in an engine where compressed air is pumped into the cylinders of the engine during starting.

One object of the present invention is to obtain an improved device in an internal combustion engine which is preferably equipped with a turbo unit, where the turbo function can be initiated earlier than in previously known devices and which adds to the starting torque of the engine.

SUMMARY OF THE INVENTION

In accordance with the present invention, this and other objects have now been realized by the invention of apparatus for supplying air to an internal combustion engine including at least one cylinder comprising an inlet for supplying air to the at least one cylinder, a tank for storing additional air under pressure, a feeder for supplying the additional air from the tank, a valve for supplying the additional air to the at least one cylinder from the feeder, the valve comprising a first valve portion for supplying the air to the at least one cylinder, the first valve portion being movable between a closed position in which the air cannot be supplied to the at least one cylinder and an open position in which the air is supplied to the at least one cylinder, the first valve portion including a passage connected to the feeder for supplying the additional air to the at least one cylinder therethrough. In a preferred embodiment, the valve includes a second valve portion disposed in the passage, the second valve portion movable between a closed position in which the additional air cannot be supplied to the at least one cylinder and an open position in which the additional air is supplied to the at least one cylinder. Preferably, the apparatus includes a spring element connected to the first and second valve portions, the spring element urging the second valve portion into the closed position.

In accordance with one embodiment of the apparatus of the present invention, the first valve portion includes a first valve stem, and the second valve portion includes a second valve stem, the second valve stem movably positioned with the passage, and the first and second valve stems being disposed substantially parallel to each other.

In accordance with another embodiment of the apparatus of the present invention, the apparatus includes a valve seat for the at least one cylinder, and wherein the first valve portion includes a first valve head including an inner surface and contacting the valve seat when the first valve portion is in the closed position, and wherein the second valve portion includes a second valve head contacting the inner surface of the first valve head when the second valve-portion is in the closed position.

In accordance with another embodiment of the apparatus of the present invention, the first valve portion includes closure means for terminating the flow of the additional air. In a preferred embodiment, the closure means comprises at least one aperture connecting the feeder to the passage, the first valve portion being movable between a first position wherein the aperture is aligned with the feeder to supply the additional air through the aperture and a second position wherein the aperture is not aligned with the feeder and the additional air is not supplied through the aperture.

In accordance with the present invention, a method has also been devised for supplying air to an internal combustion engine including at least one cylinder, an inlet for supplying air to the at least one cylinder, and a valve including a first valve portion including a passage therein, the method comprising supplying the air to the at least one cylinder from the inlet, and supplying additional air to the at least one cylinder through the passage in the first valve portion. In a preferred embodiment, the at least one cylinder includes an intake stroke, and the method includes supplying the additional air to the at least one cylinder during a first predetermined time interval during the intake stroke with the first valve portion in a closed position.

In accordance with one embodiment of the method of the present invention, the method includes terminating the supply of the additional air during a second predetermined time interval during the intake stroke with the first valve portion in an open position.

In accordance with another embodiment of the method of the present invention, the method includes delivering the additional air to the at least one cylinder by means of a control valve, and actuating the control valve based on the presence of a predetermined operational condition of the internal combustion engine. In a preferred embodiment, the method includes placing the control valve in a non-actuated condition based upon the presence of a predetermined charging pressure in the inlet.

In accordance with one embodiment of the method of the present invention, the method includes activating a smoke-limiter of the internal combustion engine by means of the additional air.

The term "additional air" in the following description refers to air supplied by means of the present invention to each of the engine cylinders under certain predetermined conditions. The term "ordinary air" refers to air fed to the engine during its normal operation.

BRIEF DESCRIPTION OF THE DRAWINGS

The present invention will be described in the following detailed description in greater detail, with reference to the appended drawings, in which:

FIG. 3b is a side, elevational schematic representation of another phase of the function of the valve device shown in FIG. 2;

FIG. 3c is a side, elevational, schematic representation of another phase of the function of the valve device shown in FIG. 2;

FIG. 3d is a side, elevational, schematic representation of another phase of the function of the valve device shown in FIG. 2;

FIG. 3e is a side, elevational, schematic representation of another phase of the function of the valve device shown in FIG. 2;

DETAILED DESCRIPTION

Referring to the Figures in which like reference numerals refer to like element thereof, FIG. 1 schematically shows a device in which the present invention can be used. FIG. 1 thus shows an internal combustion engine 1 which is preferably a conventional diesel engine. The engine 1, in a known manner, has an outlet 2 through which the exhaust gases generated in the combustion chamber of the engine 1 are led. The engine 1 further comprises a plurality of cylinders 3. Although FIG. 1 illustrates an engine 1 equipped with six cylinders, the invention can also be used in connection with other cylinder configurations.

The outlet 2 leads to a turbo unit 4, which in a known manner comprises a turbine 5. The flow of exhaust gases through the outlet 2 causes the turbine 5 to rotate, thus absorbing energy from the exhaust gases. When the exhaust gases have passed through the turbine 5, they are transported away through an exhaust pipe 6. In a manner which as such is known, the turbine 5 drives a compressor 7 which is connected to the turbine 5 by means of a spindle 8 which is common to the turbine 5 and the compressor 7. The compressor 7 compresses the air which is taken in through an inlet 9. The air supplied from the compressor 7 is fed to the engine 1 through an air passage 10 which terminates in an intake casing 11. The air which is supplied from the intake casing 11 is then fed to the different cylinders 3. Furthermore, fuel is fed to the different cylinders 3 by means of (not shown) injection devices.

The present invention is based on the principle of feeding additional air directly into the cylinders 3 in connection with the starting phase of the engine 1. i.e. during the initial phase when it functions as an aspirating engine. This air is fed through a plurality of air passages 12, which lead up to the different cylinders 3. The feeding of air to the different cylinders 3 is done by means of special valve devices 13 which are provided at each of the different cylinders 3. The function and design of such a valve device 13 will be described in detail below, with reference to FIG. 2.

The air to the different air passages 12 is controlled by means of a control valve 14, which is arranged in connection with the engine 1. The function and design of the control valve 14 will be described below in connection with FIG. 5. Air is fed to the control valve 14 from a pressure tank 15, which is arranged in the vehicle in question. The pressure tank 15 is in turn fed with air from the brake air compressor 16 from an air passage 17 and a check valve 18, which is arranged in communication with the pressure tank 15. Apart from a brake air compressor 16, another source of compressed air can also be used for this purpose. Air can be fed from the pressure tank 15 to two feeder passages, 19 and 20, and further on to the control valve 14. By means of a relay valve 21 and a control means 22, which are arranged in connection with the pressure tank, the working pressure in the feeder passages, 19 and 20, can be adjusted. In this connection it is advantageous to use a relay valve 21, since such a valve can efficiently handle large mass-flows of air from the pressure tank 15 to the control valve 14. Although FIG. 1 shows a relay valve 21 which is connected to feeder passages, 19 and 20, a relay valve with only one feeder passage can also be used according to the present invention. The working pressure in the feeder passages, 19 and 20, is set so that it is somewhat lower than the pressure in the pressure tank 15. The difference in pressure is a measure of the capacity of the system.

As will be described in greater detail in the following description, the control valve 14 can be activated when there is a need for additional air, for example when starting the engine, in which case air is fed from the pressure tank 15 through the feeder passages, 19 and 20, and the control valve 14 to respective valves 13 on the cylinders 3.

When air is fed to a certain cylinder 3, this is done by means of the above-mentioned valve device 13 which will now be described with reference to FIG. 2. The valve device 13 is arranged at the inlet 23 of the cylinders 3 of the engine 1. The inlet 23 is used for feeding ordinary air to the cylinder 3. At the point where the inlet 23 enters the cylinder 3, there is arranged a valve seat 24 against which a first valve 25 is arranged. To this end, the first valve 25 comprises a first valve head 26, which is in contact with a lower, essentially circular edge 27. The first valve head 26 is connected to a first valve-stem 28, which runs in an essentially jacket shaped valve guide 29. The function of the first valve 25 corresponds to the ordinary valve function of a diesel engine for the supply of ordinary air to the combustion in the various cylinders.

Using the force from an external valve spring 30 and an internal valve spring 31, the first valve head 26 is urged into contact with the valve head 24. To be more precise the valve springs, 30 and 31, are in contact with, and press against, a spring washer 32 which by means of a valve lock 33 is in connection with the first valve-stem 28.

The lower part of the first valve-stem 28 is essentially tube-shaped, and comprises an inner passage-section 34 which at its lower end is widened in such a way that it houses a second valve 35 with a second valve head 36 which is in contact with a further valve head in the shape of an inner surface 37 of the first valve head 26. The second valve head 36, is furthermore connected to a second valve-stem 38 which has its extension inside the passage-section 34. The upper end of the second valve-stem 38 is connected to a valve tip 39, on the upper side of which there is arranged a valve cap 40. The second valve head 36 is moved to the position where it is in contact with the inside of the first valve head 26 by means of a spring element 41 which comprises two cup-springs. This spring element 41 is attached to the valve tip 39 by means of a spring washer 42 which is locked against the valve tip 39 using a locking clip 43.

The upper part of the first valve-stem 28 is shaped with a through-going passage-section 44, the inner dimensions of which essentially correspond to the outer dimensions of the second valve-stem 38. The second valve-stem 38 furthermore runs inside the upper passage-section 44 by means of a liner 45. The upper passage-section 44 joins the lower passage-section 34 which thus has a larger diameter than the upper passage-section 44. There is also arranged along the circumference of the first valve-stem 28 a plurality of holes 46, preferably four. The valve guide 29 also consists of an upper part and a lower part arranged in the cylinder head. The gap between the lower end of the upper part and the upper end of the lower part is shaped as a cavity 47 to which a feeder passage 48 is connected. In the normal position of the valve device 13, i.e. when the first valve 25 is in contact with the valve head 24 and the second valve 35 is in contact with the inside of the first valve head 26, the cavity 47 in the valve guide 29 is aligned with the holes 46 in the first valve-stem 28.

In order to provide additional air to the cylinder 3 there is also provided a drilled feeder passage 48 which terminates at the cavity 47 in the valve guide 29. The feeder passage 48 is connected to the different air passages 12 (compare FIG. 1). As will be described in detail below, air can be supplied to the feeder passage 48 by means of the control valve 14 and further on to the lower passage-section 34. The additional air is thus led towards the engine cylinder from the second valve 35 which can be opened and closed under certain conditions, as will be described below.

The second valve-stem 38 is, at least along a certain section, dimensioned so as to be a good f it against the lower end of the upper passage-section 44. This enables transfer of heat between the second valve-stem 38 and the first valve-stem 28, at the same time as it provides a sealing function which prevents air flowing upwards along the upper passage-section 44. It also protects the second valve-stem 38 from the risk of breaking, especially during rapid operation.

The function of the valve device 13 will now be described with reference to FIG. 2 and FIGS. 3a–3e which schematically illustrate the different stages when supplying air to the various cylinders 3. FIGS. 3a–3e show the intake stroke in a cylinder 3 which is equipped with the valve device 13 according to the present invention. As is first shown in FIG. 3a, the piston 49 of the cylinder 3 is in its upper position in the cylinder 3. The piston 49 is, in a conventional manner, connected to the crankshaft 50 by means of a connecting rod 51. In this upper position the first valve 25 is in contact with the valve head 24 due to the spring-force from the springs, 30 and 31, (compare FIG. 2). Furthermore, the second valve 35 is in contact with the inside of the first valve head 26 due to the spring-force from the spring element 41.

In the next phase, as shown in FIG. 3b, the piston 49 moves downwards. At the same time, the valve device 13 is influenced by the camshaft of the engine (the camshaft is not shown in the drawings). Thus, the spring-force of the spring element 41 will first be exceeded, which leads to the second valve-stem 38 being pressed a small distance downwards, whereby the second valve head 36 is lifted out of contact with the inside of the first valve head 26. If the conditions for feeding additional air through the feeder passage 48 are fulfilled, and air has been fed to the lower passage-section 34, a marginal amount of additional air will now during a short time be fed to the cylinder 3.

FIG. 3c shows the following phase in which the piston 49 is on its way down and the, first valve 25 has been lifted out of the valve seat 24. During this phase, the ordinary air is let into the cylinder 3 from the intake 23 in the cylinder head. Furthermore, the first valve-stem 28 has been displaced a distance downwards towards the cylinder 3. This means that the holes 46 are no longer aligned with the cavity 47, which causes the feeder passage 48 to be out of communication with the passage-section 34. This in turn means that no additional air is supplied during this phase.

In the next phase, which is shown in FIG. 3d, the piston 49 has just passed its lowest position and is on its way upwards. Furthermore, the camshaft of the engine has influenced the valve device 13 to be moved towards its initial position, so that the first valve 25 is now closed, i.e. the first valve head 26 is in contact with the valve seat 24. According to the present invention, the control using the camshaft is arranged so that the second valve head 36 has not yet come into contact with the first valve head 26, i.e. the second valve 35 is still open. Furthermore, the first valve-stem 28 in this phase is in such a position that the holes 46 are essentially aligned with the cavity 47, which causes additional air to now be fed to the cylinder 3 from the passage defined by the lower passage section 34. In this way, the first valve 25 will thus be closed and the second valve 35 will be open for the supply of additional air, which takes place during the later part of the working phase when air is normally supplied to the cylinder 3. The duration of this sequence of events (i.e. the supply of additional air) is controlled by the shape of the camshaft, as will be described in detail below. The duration also depends on the positioning of the holes 46 in relation to the cavity 47.

Finally, FIG. 3e shows that the second valve-stem 38, and thus also the second valve head 36 has been released upwardly, so that the second valve 35 is closed, i.e. the second valve head 36 is in sealing contact with the inside of the first valve head 26. The spring element 41 is here so dimensioned that its spring-force, which attempts to close the second valve 35, exceeds the force with which the air pressure in the lower passage-section 34 affects the second valve 35. Subsequent to this final phase, the compression stroke is started, in a known manner, and a larger amount of fuel can be supplied, since a certain amount of additional air now has been fed into the cylinder 3.

FIG. 4 shows a schematic cross-section of a camshaft 52 which can be used in connection with the present invention. In a way which as such is known, and which is not shown in detail in the drawings, the engine is used to drive the cam haft 52. The camshaft 52 affects a valve lifter 53, which, in turn, by means of a (not shown) arrangement with a push-rod and a rocker lever causes the valve device 13 to open and close. FIG. 4 shows the radius r, of the camshaft 52 with a solid line, while the radius $r_2$ of a basic circle is indicated with a broken line. The figure also shows five different angle-sectors, $\alpha_1, \alpha_2, \alpha_3, \alpha_4$ and $\alpha_5$, which correspond to the different phases as shown in FIGS. 3a–3e. Angle-sector $\alpha_1$, thus corresponds to what is shown in FIG. 3a, and the valve device 13 is closed, i.e. both the first valve 25 and the second valve 35 are closed. Angle-sector $\alpha_2$ corresponds to what is shown in FIG. 3b, i.e. the first valve 35 is open while the first valve 25 is closed. A marginal addition of air to the different cylinders takes place during a short amount of time here. Furthermore, angle-sector a3 corresponds to that shown in FIG. 3c, i.e. the first valve 25 is open but no additional air is supplied since the holes 46 are not aligned with the cavity 47.

During angle-sector $\alpha_4$, the first valve 25 starts to close. Finally, angle-sector $\alpha_5$ corresponds to FIG. 3d, i.e. a position where the first valve 25 is closed but the second valve 35 is still kept open. This angle-sector $\alpha_5$ in this manner forms a "plateau" with an essentially constant radius of the camshaft 52 with additional air being supplied to the different cylinders. By varying the size of this angle-sector $\alpha_5$, the period of time during which additional air is supplied can be varied.

FIG. 5 shows the control valve 14 which is used for feeding additional air from the pressure tank 15 to the different cylinders 3 (compare FIG. 1). The control valve 14 comprises a valve housing 53 in which there is arranged an electrical solenoid 54. The solenoid 54 is of an essentially known kind, and comprises a core 55 which in its normal condition is-influenced by a closing-spring 56 to be moved in the direction of an outlet 57, which in turn is connected to the different air passages 12 (compare FIG. 1). The control valve 14 also comprises a piston 62 arranged to be moved inside a cylinder in the valve housing 53. The piston 62 has a pin 58, the lower end of which is arranged to interact with a seat 59 arranged at the outlet 57, which seat preferably comprises a rubber surface. In this way, the outlet 57 can be blocked, which is done during certain conditions, as will become evident in the following description. The piston 62 with its corresponding pin 58 are also influenced towards an upper position in the cylinder 63 by means of an opening spring 72.

The cylinder 63 can also be supplied with air at charging pressure from the inlet casing of the engine from a further inlet 64 which leads up to the cylinder 63. With reference to FIG. 1 and FIG. 5, it will become evident that the inlet jacket 11 is connected to the inlet 64 by means of a passage 65.

The function of the control valve 14 is controlled using a detector 73, preferably in the form of a switch for detecting the position of the accelerator-pedal in the vehicle. The detector 73 is connected to a power source 74 in the vehicle and to a relay 75. The relay 75 is also fed with a voltage from the generator 76 of the engine. In this way, the solenoid can only be activated when the engine is running. When this is the case, the solenoid can be activated if the accelerator-pedal is in a certain position, preferably fully depressed. This causes the core 55 to be pushed a certain distance into the solenoid 54 while compressing the spring 56. Normally this happens at the same time as the opening spring 72 has affected the piston 62 to assume its upper position in the cylinder 63, in which case the pin 58 is not in engagement with the seat 59. In this manner, additional air can be fed from the outlet 57 to the different air passages 12. For this purpose, the feeder passages 19 and 20 are connected to the control valve 14, and to be more exact, to two inlets 60 and 61.

If the control valve 14 is in its open position, additional air will thus be fed to the different cylinders. This enables additional fuel to be fed to the different cylinders. This, in turn, leads to an increase of the charging pressure at the inlet casing 11, and thus also at the inlet 64. If the charging pressure increases, it will affect the piston 62 and the pin 58 to be moved downwards against the force from the opening spring 72, so that the outlet 57 is blocked and the air supply is closed. When the piston 62 is pressed downwards, the core 55 will remain in its upper position. The control valve 14 is thus controlled by the position of the accelerator-pedal and the charging pressure from the engine. In this way, additional air can be supplied to the engine 1 only when it is really necessary, i.e. when the charging pressure falls below a lowest level.

FIG. 6 shows an alternative embodiment of the present invention, in which the components which correspond to that which has been described above have been given corresponding reference numerals. In this embodiment the control valve 14 is also connected by means of a further connection 66 to a reducing valve 67 for the adjustment of a certain pressure which is brought to influence a two-way valve 68. This two-way valve 68 is arranged for pressurizing a smoke-limiter 69 of the engine for adding extra fuel to the combustion. The smoke-limiter 69 is known as such and is connected to an injection pump 70 of the engine, so that the amount of fuel supplied to the engine can be adjusted according to the charging pressure or the additional air. There is also a further connection 71 between the inlet jacket 11 and the two-way valve 68.

The smoke-limiter 69 is utilized to limit the amount of fuel injected to the engine 1 at low loads so that there is no smoke generated in the exhaust gases. When the load increases, the charging pressure in the inlet jacket 11 will increase. By means of the connection 71 the smoke limiter is influenced by the charging pressure so that the injection pumps 70 delivers more fuel to the engine 1. Furthermore, the two-way valve 68 comprises a moving piston (the moving piston is not shown in the drawings), an inlet for the connection 71, an inlet for the connection 66 and an outlet for letting out air with the highest of the pressures present in the connections 71 and 66.

According to the present invention additional air can be fed to the cylinders 3, thus enabling the feeding of an increased amount of fuel. Initially, this will not cause an increase of pressure in the inlet jacket, i.e. the smoke-limiter 69 is not exposed to any charging pressure. Normally this would mean that an increased amount of fuel would not have been permitted. According to this embodiment, the smoke-limiter 69 is thus exposed to an "artificial pressure," which is supplied by the connection 66 being connected to the two-way valve 68. When the additional air is supplied with a certain pressure, air with this pressure is also fed to the two-way valve 68 which means that the injection pump 70 can be activated for an increased supply of fuel. When the ordinary charging pressure exceeds the pressure with which the smoke-limiter 69 is fed from the control valve 14 by means of the two-way valve 68, the charging pressure in the connection 71 takes over the control of the smoke-limiter 69 by means of the two-way valve 68. The "artificial pressure" delivered through the connection 66 is adjusted by means of the reduction valve 67.

The pressure from the control valve 14 can furthermore be dumped using a solenoid valve 77 connected after the reduction valve 67. The solenoid valve 77, is in turn connected to the relay 75 (see FIG. 5).

The present invention is based on the principle that air is supplied from the pressure tank 15 during the initial "aspirating engine phase" of the engine, thus enabling an increased amount of fuel to be supplied. This, in turn, generates a high increase in starting torque, which eliminates the perception of the engine as being insufficient with regard to the starting torque.

The present invention is not limited to, the above-described embodiments but can be varied within the scope of the appended claims. The present invention can for example be used in different kinds of combustion engines, e.g. diesel engines and gasoline engines. The present invention is furthermore not limited to use in connection with turbocharged engines, but can also be used for supplying additional air in engines without turbo units.

Furthermore, the condition at which the solenoid 54 of the control valve 14 is activated can be a full throttle position of the accelerator-pedal or any other preset throttle position.

The control valve 14 can, in an alternative embodiment, be replaced by an electrically controlled valve which is controlled by a computer-based control unit. A detector for detecting the position of the accelerator pedal can then be connected to the control unit which in turn controls the electrical valve for feeding additional air.

Finally, instead of the detector 73 another detector can be used to detect a certain operational parameter in a vehicle. For example detectors for detecting the rpm, amount of fuel and charging pressure can be utilized to control the function of the control valve.

What is claimed is:

1. Apparatus for supplying air to an internal combustion engine including at least one cylinder comprising an inlet for supplying air to said at least one cylinder, a tank for storing additional air under pressure, a feeder for supplying said additional air from said tank, a valve for supplying said additional air to said at least one cylinder from said feeder, said valve comprising a first valve portion for supplying said air to said at least one cylinder, said first valve portion being movable between a closed position in which said air cannot be supplied to said at least one cylinder and an open position in which said air is supplied to said at least one cylinder, said first valve portion including a passage connected to said feeder for supplying said additional air to said at least one cylinder therethrough.

2. The apparatus of claim 1 wherein said valve includes a second valve portion disposed in said passage, said second valve portion movable between a closed position in which said additional air cannot be supplied to said at least one cylinder and an open position in which said additional air is supplied to said at least one cylinder.

3. The apparatus of claim 2 including a spring element connected to said first and second valve portions, said spring element urging said second valve portion into said closed position.

4. The apparatus of claim 2 wherein said first valve portion includes a first valve stem, and said second valve portion includes a second valve stem, said second valve stem movably positioned within said passage, and said first and second valve stems being disposed substantially parallel to each other.

5. The apparatus of claim 2 including a valve seat for said at least one cylinder, and wherein said first valve portion includes a first valve head including an inner surface and contacting said valve seat when said first valve portion is in said closed position, and wherein said second valve portion includes a second valve head contacting said inner surface of said first valve head when said second valve portion is in said closed position.

6. The apparatus of claim 1 wherein said first valve portion includes closure means for terminating the flow of said additional air.

7. The apparatus of claim 6 wherein said closure means comprises at least one aperture connecting said feeder to said passage, said first valve portion being movable between a first position wherein said aperture is aligned with said feeder to supply said additional air through said aperture and a second position wherein said aperture is not aligned with said feeder and said additional air is not supplied through said aperture.

8. A method for supplying air to an internal combustion engine including at least one cylinder, an inlet for supplying air to said at least one cylinder, and a valve including a first valve portion including a passage therein, said method comprising supplying said air to said at least one cylinder from said inlet, and supplying additional air to said at least one cylinder through said passage in said first valve portion.

9. The method of claim 8 wherein said at least one cylinder includes an intake stroke, and including supplying said additional air to said at least one cylinder during a first predetermined time interval during said intake stroke with said first valve portion in a closed position.

10. The method of claim 8 including terminating said supply of said additional air during a second predetermined time interval during said- intake stroke with said first valve portion in an open position.

11. The method of claim 8 including delivering said additional air to said at least one cylinder by means of a control valve, and actuating said control valve based on the pressure of a predetermined operational condition of said internal combustion engine.

12. The method of claim 11 including placing said control valve in a non-actuated condition based upon the presence of a predetermined charging pressure in said inlet.

13. The method of claim 11 including activating a smoke-limiter of said internal combustion engine by means of said additional air.

* * * * *

UNITED STATES PATENT AND TRADEMARK OFFICE
CERTIFICATE OF CORRECTION

PATENT NO. : 6,138,616
DATED : October 31, 2000
INVENTOR(S) : Arne Swensson

It is certified that error appears in the above-identified patent and that said Letters Patent is hereby corrected as shown below:

Column 10,
Line 41, delete "8" and insert therefor -- 6 --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,138,616
DATED : October 31, 2000
INVENTOR(S) : Arne Svensson

It is certified that error appears in the above-identified patent and that said Letters Patent is hereby corrected as shown below:

<u>Column 10,</u>
Line 41, delete "8" and insert therefor -- 6 --.

This certificate supersedes Certificate of Correction issued March 2, 2004.

Signed and Sealed this

Tenth Day of August, 2004

JON W. DUDAS
*Acting Director of the United States Patent and Trademark Office*